United States Patent Office 2,949,358
Patented Aug. 16, 1960

2,949,358

REINFORCED HEAT RESISTANT REFRACTORY-METAL ALLOYS

Guy B. Alexander and Paul C. Yates, Brandywine Hundred, and Sherwood F. West, Christiana Hundred, Del., assignors to E. I. du Pont de Nemours and Company, Wilmington, Del., a corporation of Delaware No Drawing. Filed Sept. 23, 1957, Ser. No. 685,423

16 Claims. (Cl. 75—176)

This invention relates to metals of the group consisting of molybdenum, rhenium and tungsten and their alloys, which have improved resistance to oxidation at high temperature by reason of the inclusion therein of uniformly dispersed, sub-micron sized refractory particles, and to processes for producing the so-modified metals. More particularly the invention is directed to such metals in which the refractory particles have an average size in the range of 5 to 600 millimicrons, the refractory is an oxide having a melting point above 1000° C. and a free energy of formation at 1000° C. of from 60 to 150 kilogram calories per gram atom of oxygen, and the volume loading of refractory in the metal is about from 0.5 to 30 percent. The invention is further directed to processes for making such compositions comprising mixing (a) a solution of an ionizable compound of a metal selected from molybdenum, tungsten and rhenium, (b) a solution of an ion with charge opposite to that of the ion of (a) containing the metal selected from molybdenum, tungsten, and rhenium, said ion of opposite charge being selected from the group consisting of hydrogen, hydroxyl, carbonate, bicarbonate, oxalate, and carboxyl ions, and (c) a liquid dispersion of particles, having an average size in the range of 5 to 600 millimicrons, of an oxygen compound of the metal of said refractory oxide, said oxygen compound, when heated to constant weight at 1500° C., being a refractory oxide having a melting point above 1000° C. and a free energy of formation at 1000° C. of from 60 to 150 kilogram calories per gram atom of oxygen, the dispersion and solutions being brought together at such rates that in the resultant mixture the proportion of dissolved metal from (a) does not substantially increase and in each time interval which is at least 5 percent of the total addition time the weight ratio of metal added in (a) to particles added in (c) is from 0.2 to 5 times the final weight ratio, whereby the metal ion from (a) is precipitated in the form of a hydrous, oxygen-containing compound coating surrounding the particles of (c), heating said precipitate-surrounded particles to an elevated temperature, whereby said precipitate is dehydrated and metal-oxygen compounds, other than oxides, in the surrounded particles are converted to the corresponding oxides, and reducing the precipitate coating to metal.

Molybdenum, rhenium and tungsten, whose respective melting points are 2620, 3440 and 3387° C., are among the highest melting metals known. For this reason it might be expected that these metals would be among the most preferred materials of construction for service at very high temperatures. Unfortunately, they suffer from the disadvantage that they are not resistant to oxidation when heated in air at temperatures upwards of only 800° C. Since it is not practicable to exclude air from the metals in most of such high temperature applications, they have found relatively limited use at high temperatures.

It is, then, a purpose of the present invention to enhance the utility of molybdenum, rhenium and tungsten at very high temperatures by decreasing the rate at which they oxidize in air. This objective has previously been sought through such means as coating the metals with oxidation-resistant coatings. The latter approach has been commercially unattractive because with coatings heretofore available the formation of pinholes could not be entirely avoided and once a pinhole is formed the coating becomes worthless.

It would not, of course, suffice to retard oxidation of molybdenum, rhenium and tungsten at high temperatures if the method employed detrimentally affected such properties of the metal as its tensile strength or stress rupture. Accordingly, it is a purpose of the present invention to accomplish the aforementioned objective without detrimentally affecting, and if possible improving, the properties of the metals.

Now according to the present invention it has been found that the foregoing objectives can be realized, and that molybdenum, rhenium, and tungsten metals having oxidation resistance at very high temperatures can be produced, by dispersing refractory oxide particles uniformly throughout the metals. The refractory particles must have an average particle size in the range of 5 to 600 millimicrons and must be an oxide having a melting point above 1000° C. and a free energy of formation at 1000° C. of from 60 to 150 kilogram calories per mole per oxygen atom. The volume loading of the refractory in the metal must be controlled within the range from 0.5 to 30 percent.

It has also been found that the novel metal compositions can be produced by depositing the molybdenum, rhenium, or tungsten in the form of a hydrous, oxygen-containing compound as a coating surrounding particles of a refractory oxide or of a compound which becomes an oxide upon heating, converting the particles, if such latter substance, to a refractory oxide by heating, and reducing the oxygen-containing compound to the corresponding metal, as by heating at an elevated temperature with hydrogen, whereby a powder consisting of refractory oxide particles coated with the metal is obtained. Maintenance of the refractory particles as substantially discrete, individual units during the precipitation step can be accomplished by mixing (a) a solution of an ionizable compound of molybdenum, tungsten, or rhenium, such as molybdenum chloride, (b) a solution of certain ions with charge opposite to that of the molybdenum-, tungsten-, or rhenium-containing ion, such as hydroxyl ions, and (c) a liquid dispersion of the refractory oxide particles or particles convertible to refractory oxide, such as a thoria sol, while controlling the rates of adding (a), (b), and (c) so that (1) the proportion of molybdenum-, tungsten-, or rhenium-containing ion in the mixture does not increase substantially, and (2) the weight ratio of said metal added to particles added is from 0.2 to 5 times the final weight ratio. As a final step the powder can be compacted according to conventional techniques to form a metal body in which the refractory oxide particles are uniformly dispersed.

In the compositions and processes of this invention it is most important that the refractory particles be uniformly dispersed in the modified metals. The processes of the invention are operated in such a manner that this result is achieved. To this end, it is necessary that the refractory particles in the starting dispersion be of the proper size, that is 5 to 600 millimicrons in diameter, and that the hydrous oxygen-containing compound of molybdenum, rhenium or tungsten be deposited upon the dispersed particles. It is undesirable that the particles be coagulated before they are embedded in the precipitate of hydrous oxygen-containing metal compound, since coagulated particles will not be uniformly dispersed throughout the final reduced metal. It is also undesirable to have the hydrous oxygen-containing compound of the metal form a precipitate without simultaneous inclusion of the particles, since then there will be some parts of the final metal which do not contain particles. Uniform and homogeneous dispersion of the particles throughout the precipitate of hydrous oxygen-containing compound of the metal, insures the effectiveness of the particles in improving the oxidation resistance of the resulting metal product.

The desired uniformity of dispersion is accomplished according to the present invention by precipitating the hydrous oxygen-containing compound of the metal simultaneously with the addition of refractory oxide dispersion. In this way no large excess of either component accumulates in the mixture and there is no opportunity for any of the above-mentioned undesirable conditions to occur.

The fact as to whether or not uniform dispersion of the refractory oxide in the metal has been achieved can be determined upon the final product. By uniform dispersion is meant that the refractory oxide particles are present inside the grains of the molybdenum, rhenium or tungsten metal as well as at the grain boundaries. The state of dispersion can be shown by an electron micrograph using replica techniques, whereby it can be seen that the particles are present inside the grain as well as at the grain boundaries.

The oxide particles should be so well dispersed throughout the metal structure that, as shown by the replica technique, there are no areas greater than about one micron in diameter which are free from refractory oxide particles; where the oxide particles are smaller than about 50 millimicrons, there should be no areas having a diameter greater than about 250 millimicrons which are oxide-free. Due to accidental contamination or to imperfect preparation of the replica, there might occasionally occur areas which seem to be free from particles; however, at least half of the areas examined should not show areas larger than 1 micron, free from oxide particles.

Even if there are small areas which are free of refractory oxide particles in a metal mass produced according to the invention, and these areas at high temperature oxidize destructively, when the oxidation front penetrates to oxide-filled metal, the oxidation will stop, or at least be greatly retarded. The important consideration is that the colloidal oxide be sufficiently uniformly distributed throughout the metal that upon exposure to oxidizing conditions, the penetration of the metal surface by oxygen and destruction of the surface by oxidation will proceed to a depth of no more than a few microns before sufficient refractory oxide particles are encountered to retard drastically the oxidation process.

In preferred aspects of the invention the ratio of the number of filler particles in the grain boundaries to the number of filler particles inside the grains is in the range from 0.2:1 to 5:1. Determination of this ratio can be made as follows: Prepare a micrograph by the carbon replica method, and select an area typical of grain boundaries. Measure an area along said grain for a distance of 100D, where D is the number average particle size and 2D wide on either side of the grain, i.e., an area of $400D^2$. Count all the particles in this area; let this number be $N_1$. Measure another area 20D on each side, i.e., an area of $400D^2$ which is a square. Count all the particles in this area, $N_2$. $N_1/N_2$ will be in the range of 0.2:1 to 5:1 for preferred products of the invention.

The particulate refractory employed in the present invention must first of all be an oxide having a melting point above 1000° C. Oxides with lower melting points could be used, but they would actually melt below the desired surface temperatures of the ultimate product and no advantage would be gained. Moreover, even below their melting points they show a tendency to grow substantially in size and hence give products of unpredictable properties.

Where the products of the invention are to be used for making metal parts which will see service at very high temperature, it is preferred to use oxides with even higher melting points, for example above 1600° C., or even about 2000° C. Thus oxides having a melting point in the range from 2000° to 3000° C. are a preferred class of filler materials.

The refractory oxide must be one having a free energy of formation at 1000° C. of from 60 to 150 kcal. per gram atom of oxygen. Oxides with free energies of formation outside this range are unstable in the processes of the invention and do not give satisfactory results.

Silica, for instance, is a refractory oxide which can be used according to the invention. Silica has a free energy of formation of 156 kcal. per mol or 78 kcal. per gram atom of oxygen. Since the silica molecule contains two oxygen atoms the permissible range of free energy of formation is from 120 to 300 kcal. per mol and, hence silica is well within the range of operability and is suitable.

Among the basic oxides which can be employed are magnesia, calcium oxide, barium oxide, cerium oxide, strontium oxide, and oxides of other rare earths. Among suitable acidic oxides are silica, titania, alumina and chromium oxide. Compositions containing two oxides such as silica, an acidic oxide, and calcium oxide, a basic oxide, can often be used to advantage. The reaction product of silica with zirconia, forming zircon, is suitable. Similarly, with silica one can use zinc oxide, alumina, or hafnia. Zinc oxide, zirconia, thoria, and hafnia can, of course, be used alone and the latter three are among the most preferred oxides. The mixed oxides can be in the form of silicates such as magnesium silicate, aluminum silicate, calcium silicate, iron silicate and nickel silicate.

Compounds which on heating will decompose to particles of metal oxide as above-described can also be used. For example, one can start with a metal carbonate or oxalate and form a dispersion of the metal oxide by heating above the decomposition temperature. Calcium carbonate, for instance, is such a material.

If the refractory oxide is to be formed by heating another material in situ, as above-mentioned, it is important that the material be one which is in about the same finely divided state as the oxide to which it is to be converted and not in the state of well-formed macroscopic crystals. The size of the particles, such as particles of metal carbonate or metal oxalate, should not be substantially larger than the particle size of the refractory which is ultimately to be embedded in the precipitated hydrous oxygen-containing compound of molybdenum, tungsten or rhenium. While the coarser particles of, say 600 millimicrons diameter, can be satisfactorily embedded in a precipitate of hydrous metal-oxygen compound, it is generally preferred that the particles be much more finely divided than this, although particles much smaller than 5 millimicrons do not convert to refractory oxides of the desired particle size range unless they coalesce and grow upon heating.

The oxide particles in the starting aqueous dispersion must be in the sub-micron range—that is, less than 1 micron in maximum dimension, and must be in the size range of 5 to 600 millimicrons in diameter. While the term "diameter" implies that the particles must be spheres, this is not actually the case and the particles can be any shape provided their maximum dimension is within the specified range. Isotropic particles are preferred, and it is preferred that the maximum dimension be in the range of 5 to 200 millimicrons and still more preferably from 10 to 100 millimicrons. If the particles are isotropic, i.e. spheroidal or cubical in shape, the ultimate products have maximum ductility. On the other hand, anisotropic particles can be used where it is desired that the ultimate metal compositions have minimum ductility. Anisotropic particles which can be used include finely divided fibers and platelets such as are often found in the case of silicate minerals. Asbestos and bentonite are in this class. With such particles it will often happen that one or two of the dimensions will be considerably different from the other two or one. Where shape is such an important factor, the size of the particle for purposes of defining this invention, is considered to be one third of the sum of the three particle dimensions. For example, a fiber of asbestos might be 1000 millimicrons long but only 10 millimicrons wide and thick. This fiber would be considered to have a size of $$\frac{1000+10+10}{3}$$

or 340 millimicrons, and hence would be in the desired range.

It is preferred that the refractory oxide particles be dense, discrete and anhydrous for best results. However, the particles can consist of aggregates of smaller ultimate particles provided the aggregates are themselves within the size ranges above-specified. For example, among the most preferred dispersions to use is a silica sol having dense, discrete, spheroidal ultimate particles about 17 millimicrons in diameter, but silica sols containing aggregates of such particles made up of 2, 3 or 4 units also give excellent results.

Colloidal metal oxide aquasols are particularly useful as a source of the refractory oxide in the desired finely divided form. For example, silica aquasols such as those described in Bechtold and Snyder United States Patent 2,574,902 are especially useful as a source of silica particles. The zirconia sols are similarly useful. The art is familiar with titania sols, these being described, for instance, by Weiser in "Inorganic Colloid Chemistry," volume II, "Hydrous Oxides and Hydroxides." Sols of alumina, thoria, magnesia and rare earth oxides are also useful as starting materials.

Suitable particulate metal oxides can also be produced by thermal processes, such as by burning metal chlorides, for instance, by burning aluminum trichloride, titanium tetrachloride, or zirconium tetrachloride to produce the corresponding oxide, under conditions adapted to give the product as discrete individual particles. The art is already familiar with such techniques. Metal carbonates, oxalates and similar compounds which decompose to metal oxides upon heating can be employed to make suitable particulate oxides which can then be dispersed in water to give the desired starting material.

Suitable materials which are refractory oxides or are convertible to refractory oxides, upon heating are conventionally employed as fillers in rubber. These include, for example, colloidal glass, finely divided precipitated calcium carbonate rubber filler, finely divided zinc oxide, bentonite clay, attapulgite clay, dispersed exfoliated vermiculite (particularly the acid-treated variety) and siliceous rubber fillers, particularly after these have been dispersed in water by drastic milling in order to break the ultimate particles apart from their aggregates. In all cases, it is important that the materials be suitably dispersed, as by colloid milling in the aqueous medium in which the hydrous oxygen-containing metal compound is to be precipitated.

Having selected a suitable particulate refractory oxide and dispersed it in water, one then deposits upon the dispersed refractory a hydrous, oxygen-containing compound of molybdenum, rhenium or tungsten. For convenience in the description which follows, molybdenum is referred to, but it will be understood that the details of the process can be applied equally well to rhenium or tungsten.

The hydrous, oxygen-containing compound of molybdenum can be, for instance, molybdenum oxide, molybdenum hydroxide or hydrous oxide of molybdenum. It will be understood that the oxide need not be anhydrous as precipitated, and will contain the elements of water, hence its designation as hydrous. The compound can be a mixed oxide and hydroxide or can contain water of hydration. The art is familiar with the various forms in which molybdenum oxides can be precipitated, and any of such compounds can be deposited according to the present invention.

The hydrous, oxygen-containing compound of molybdenum is deposited by precipitating it from a solution of an ionizable molybdenum compound by adding thereto a solution of an ion with charge opposite to that of the molybdenum-containing ion. The ion of opposite charge is selected from the group consisting of hydrogen, hydroxyl, carbonate, bicarbonate, oxalate, and carboxyl ions.

As the source of molybdenum, any water-soluble molybdenum compound can be used. Molybdenum dichloride (dissolved in an aqueous solution containing hydrochloric acid), molybdenum tetrachloride, and molybdenum pentachloride or their corresponding bromides or oxyhalides can be employed. For example, $MoOCl_4$, $MoO_2Cl_2$, and $Mo_2O_3Cl_2$ are suitable molybdenum oxychlorides. In the case of tungsten, tungsten dichloride or tungsten pentachloride can be used. Since all of these salts are easily hydrolyzed to the hydrous oxide form, it is advantageous to dissolve them in water which contains a small amount of hydrochloric acid to repress hydrolysis until such time as precipitation is desired.

In precipitating the hydrous oxygen-containing compounds of molybdenum, tungsten, and rhenium, from solutions of the lower valent metal chlorides, it is necessary to raise the pH of the solution, for example by adding an alkali. Sodium hydroxide, potassium hydroxide, ammonium hydroxide or sodium carbonate, for instance, can be employed. However, excess alkali should be avoided, since in some cases, the precipitate may redissolve in strongly alkaline solution. Calcium oxide can be used to raise the pH.

Calcium carbonate, which will raise the pH to about 7, is a satisfactory alkalizing material. Molybdenum hydroxide can be precipitated upon very finely divided calcium carbonate by adding the calcium carbonate to the molybdenum chloride in proper proportion and with suitable agitation, to provide a precipitate of molybdenum hydroxide in which excess calcium carbonate particles are embedded. When an oxide of molybdenum in one of its lower valence states is heated in a reducing atmosphere, molybdenum metal is produced while at the same time the calcium carbonate is decomposed to calcium oxide particles which remain embedded throughout the metallic molybdenum.

It is also possible to use, as the source of molybdenum, sodium or ammonium molybdate, in which case the molybdenum is in the anion rather than in the cation as in the chlorides and oxychlorides. The molybdenum is then precipitated in the form of polymolybdic acid by lowering the pH by the addition of an acid such as hydrochloric acid.

A particularly preferred method of effecting the desired precipitation of molybdenum compound is to add the molybdenum in the form of a solution of molybdenum pentachloride and the alkali as a solution of ammonium hydroxide. Using this combination as illustrative, the pentachloride and ammonium hydroxide solutions are added simultaneously but separately to the dispersion of refractory oxide particles, preferably with vigorous agitation. The rate of adding the pentachloride is slow enough that the molybdenum is precipitated as hydrous molybdic oxide as fast as it enters the reaction mixture and the proportion of dissolved molybdenum from the pentachloride does not, therefore, substantially increase.

It is important that the refractory oxide be very uniformly distributed and embedded within the hydrous molybdenum oxide precipitate. As the reagents are added to the reaction mixture, the ratio of molybdenum salt to be precipitated, to the refractory oxide particles being added must remain essentially constant throughout the reaction so that at any given instant the amount of refractory oxide in the precipitate which is being formed, will remain constant.

As an example, on precipitating from $MoCl_5$, the rate of adding the pentachloride is controlled in relation to the rate of addition of refractory oxide particles to the precipitation mixture. During any given time interval, said interval being 5% of the total time used for precipitation, the ratio of weight of molybdenum pentachloride added to the weight of refractory oxide particles (such as thoria) added is equivalent to from 0.2 to 5 times the ratio of the total pentachloride added during the whole reaction to the total weight of refractory particles added throughout the whole reaction. Thus the ratio of the molybdenum to thoria throughout the mass of final precipitate will remain relatively uniform, and there will be no portions of precipitate which are either too rich or too deficient in one component or the other.

If the volume loading of thoria in the final molybdenum metal is ultimately to be 10%, there will need to be a total of 9.5 parts by weight of thoria added for each 100 parts by weight of molybdenum in the form of molybdenum salt added. In any 5% time interval during the reaction, the ratio of thoria added to molybdenum added should be in the range from 1.9 parts by weight to 47.5 parts by weight of thoria for each 100 parts by weight of molybdenum. In this way, a product of the desired uniformity will be prepared.

In the case of adding alumina to molybdenum, the density of alumina being considerably lower than that of thoria, one would need to add 3.92 parts by weight of alumina for each 100 parts by weight of molybdenum in the form of a molybdenum salt, in order to obtain a 10 volume loading. In this instance, during the addition, in any 5% time interval, the amount of alumina added per 100 parts of molybdenum which is added should be in the range from 0.78 parts by weight to 19.6 parts by weight, in order to produce the required uniformity.

The volume of deposited molybdenum compound is usually large, relative to the volume of filler particles. The volume loading of the refractory in the molybdenum metal after reduction must be in the range from 0.5 to 30%, and from these proportions the amount of molybdenum as soluble salt, relative to the amount of filler to be used, can be readily calculated. More particularly, it is preferred that the volume loading be from 4 to 30%. When the filler particles are very small, for instance when they are 5 to 25 millimicrons, volume loadings of from 4 to 10% are preferred. The proportions of molybdenum salt, alkali, and dispersed refractory can similarly be calculated from this ultimate proportion range.

The manner of mixing the refractory oxide dispersion, the molybdenum compound, and the precipitating ion is chosen with the view of effecting mixing of the components substantially instantaneously. One convenient way of doing this is to add the components to a heel of water in a reaction kettle under vigorous agitation, especially at the point of addition. Various other mixing techniques will be apparent to those skilled in the art, such as mixing the components in turbulent flow or by adding the molybdenum compound and precipitating ion separately and simultaneously to the intake of a centrifugal pump which is circulating a body of the refractory oxide dispersion in water. When two colloidal oxide fillers are used, as, for example, silica and alumina, one may introduce four separate feed solutions into the reactor: (a) the silica aquasol, (b) the alumina aquasol, (c) the aqueous solution of the soluble molybdenum compound, and (d) the precipitating ion.

As already noted, coagulation or gelation of the sol of refractory particles during the deposition process is preferably avoided. This danger is minimized by the mixing techniques just described. It is also minimized by employing dilute solutions of the components being mixed.

It will be understood that during the deposition process the objective is that the refractory oxide particles be essentially surrounded with the oxygen-containing molybdenum compound, so that when subsequent reduction occurs later in the process, aggregation and coalescence of the oxide particles is minimized. For maximum ductility of the final metal it is especially preferred that the ultimate particles of the refractory oxide be not in contact with each other in the product from the deposition step.

After the hydrous oxygen-containing compound has been deposited upon the refractory oxide particles any salts formed during the deposition and any excess reactants are removed by filtering off the precipitated product and washing it with water. If ammonium hydroxide is used as the source of the precipitating ion, i.e. hydroxyl ions, and the ammonium salts thus formed are volatile, salt removal may be accomplished simply by heating the reaction mixture without washing. The precipitated molybdenum compound containing the dispersed refractory oxide particles is ultimately dried, suitably at a temperature of about 100° C.

The precipitated hydrous molybdenum compound on the surface of the dispersed refractory oxide particles is next reduced to metallic molybdenum by any suitable reduction technique. The art is familiar with methods whereby such oxides can be reduced, and any such method can be employed. Conveniently, the molybdenum-oxygen composition can be reduced by subjecting it to contact with a stream of hydrogen at elevated temperatures. If desired the hydrogen can be diluted with nitrogen, carbon monoxide, or hydrocarbon gases. Other gaseous reducing agents can also be used.

The temperature of reduction suitably can be in the range from 200 to 600° C., but temperatures as high as 900° C. or even higher can be used. Mixed oxides can be precipitated to make alloys of molybdenum. Thus, for example, one can prepare a molybdenum-cobalt, molybdenum-copper, molybdenum-lead, molybdenum-nickel, molybdenum-platinum, or molybdenum-iron alloy containing a dispersed refractory, by introducing a soluble salt of the second metal into the reactor during the precipitation step. Oxide-filled alloys containing, for example, from 0 to 30% of such a second metal can thus be prepared directly. In reducing some of these alloys, extremely dry, oxygen-free hydrogen must be used, at reduction temperatures of from 1000 to 1300° C.

After some reduction has been effected at lower temperatures within the above mentioned ranges, higher temperatures can be tolerated. Thus the product can be placed in the furnace at a controlled temperature and hydrogen gas slowly added. The temperature is gradually raised during reduction so that after most of the oxygen has been removed, the temperature is raised into the range from 600 to 1000° C.

The reduction is usually carried out under a flow system—that is, a stream of hydrogen is passed over the heated molybdenum-oxygen containing compound, so that the water formed in the reduction is swept out of the furnace and reversal of the reaction is prevented. To the powder obtained from the reduction reaction there can be added one or more other metal powders. For example, one can add to the reduced molybdenum powder, a powder of titanium, chromium, silicon, niobium, zirconium, aluminum, nickel, manganese, or cobalt. These powdered mixtures can then be converted to alloys as hereinafter described.

After reduction of the molybdenum coating on the refractory particles the product, with or without added metal powder, can be compacted into a dense billet and can be sintered in accordance with conventional powder metallurgy techniques. Thus, the powder can be pressed into a billet, sheet, or rod as a preliminary step and a final compaction can be effected under such conditions that the final apparent density of the product is from 90 to 100% of the absolute density, preferably from 98 to 100%. This final compaction is carried out by subjecting the reduced powder to very high pressures. In some instances it is desirable to apply heat, for example, up to say 1000° C., or even higher, during the compaction step. To obtain maximum uniformity and reproducibility of the ultimate properties it is also preferred to hot- or cold-work the resulting product, as, for example, by rolling, hot-extruding or similar techniques well-known in the metallurgical art. The rolling or compacting technique is continued until the density of the product is in the range desired.

A composition of this invention comprises a uniform dispersion, in a metal of the group consisting of molybdenum, rhenium and tungsten, of sub-micron sized particles of a refractory material, said material being a metal oxide having a melting point above 1000° C. and a free energy of formation at 1000° C. of from 60 to 150 kcal. per gram atom of oxygen.

The refractory in the compositions of the invention must be in the size range below 1000 millimicrons, preferably from 5 to 600 millimicrons, and still more preferably from 5 to 200 millimicrons. When the refractory particles become too large, oxidation resistance of the modified metals is reduced. Although very small refractory particles can be employed, they are difficult to handle because they gel readily in the processes of the invention; when the refractory particles reach about 25 millimicrons in size, they are considerably more difficult to coagulate or gel. Particles having an average size of from 10 to 100 millimicrons are within the colloidal range and can be handled without problems involving settling, particularly during the process of making the compositions of this invention. Thus, products containing particles in the size range from 10 to 100 millimicrons can be easily and readily produced directly from colloidal aquasols and hence such products are specifically preferred compositions of the invention.

Products in which the particles are substantially discrete, dense particles of a refractory oxide also are specifically preferred. Alumina, zirconia, titania, silica, magnesia, thoria, hafnia, and other rare earth oxides are especially effective oxides.

Products containing two oxides which will react with each other to form stable compounds are a preferred species of the invention. Thus, molybdenum and molybdenum alloys containing 3% silica and 1.5% zirconia form a useful group. A preferred group is that which contains a metal oxide and silica, the metal oxide being one which reacts with $SiO_2$ to form a silicate. Another preferred group is that which contains two oxides which will react to form spinels, such as the metal aluminates and metal chromites.

Preferred also are products in which the refractory is in the form of essentially isotropic particles—that is particles which approach spheroidal or cubical shape. It is particularly desirable that the particles be anhydrous in the novel compositions.

Volume loadings of the refractory in the novel metal compositions are in the range of from 0.5 to 30%. Below 0.5% there is little effect, and above 30% the mass is hard to handle because of loss of ductility. Volume loadings from 4 to 20% are preferred, with 6 to 10% being especially preferred.

The products of this invention are useful in preparing metal products. These metal products are particularly useful at elevated temperature because of their oxidation resistance. Thus, the products of the invention are useful in making molybdenum and molybdenum alloys for general application, as for use in fireproof vaults, particularly in the temperature range from 800° to 1200° C., and even at higher temperatures.

The invention will be better understood by reference to the following illustrative examples.

*Example 1*

In this example, a commercially available silica sol was used as the source of the filler material. The reactor consisted of a stainless steel cylinder with a conical bottom, fitted with connections whereby fluid could be pumped from the bottom of the reactor through a ½" pipeline and back to the reactor. Feed solutions could be introduced into the system through three separate T-tubes in the external line.

The feed solutions consisted of (a) 1 liter of ammonium molybdate, $(NH_4)_6Mo_7O_{24}.4H_2O$, in aqueous solution, prepared by dissolving 177 g. of molybdate in water, adjusting the pH to 3.5 with concentrated hydrochoric acid, and adding 7.5 g. of $N_2H_4.H_2O$ in order to reduce the molybdenum to a +5 valence state; (b) 1 liter of aqueous ammonia containing 1.5 moles of $NH_3$; and (c) 7.63 grams of a colloidal silica sol (30% $SiO_2$:$Na_2O$ 90, silica particles 17 m$\mu$, spherical and discrete, prepared as described in Example 3 of Bechtold and Snyder U.S. Patent 2,574,902) diluted to 1 liter. These feed solutions were introduced into the reactor (containing 1 liter of water), simultaneously but separately, at a rate of 50 ml./min. for each solution. The pH of the final slurry was about 8.

The precipitate of molybdenum hydroxide on the silica particles was recovered by filtration and washing. The product was dried at 240° C. This product was reduced at 550° C. in a slow stream of hydrogen in a period of 5 hours. The reduction was continued for 16 hours at 750° C. The product was a molybdenum powder containing 10 volume percent of finely divided silica dispersed therein. Upon compacting to above 90% of theoretical density a solid metallic product is obtained having substantially increased resistance to oxidation at high temperatures, as compared with a similar product containing no silica.

Similar products are prepared using colloidal aquasols of thoria, zirconia, titania, calcium carbonate, alumina, and alumino-silicates, instead of the silica sol. By using 4 T-tubes instead of 3, molybdenum containing two oxides are prepared, i.e., silica and zirconia.

*Example 2*

By repeating a deposition process similar to Example 1, a product of 3% (by volume) zirconia in molybdenum was produced. Three feed solutions were used: (a) 862 g. $MoCl_5$ in 3 l. $H_2O$, (b) 190 g. of $ZrO_2$ sol (25.3% solids) containing 10 millimicron zirconia particles diluted to 3 l. $H_2O$, and (c) 3 l. of 7 molar $NH_4OH$. The precipitated product was filtered, washed, dried, reduced in hydrogen, compacted to a ¾" dia. billet and extruded to a ¼" rod.

We claim:

1. A composition consisting essentially of a metal selected from the group consisting of molybdenum, rhenium, and tungsten, having uniformly dispersed therein sub-micron sized particles of a refractory metal oxide having a melting point above 1000° C. and a free energy of formation at 1000° C. of from 60 to 150 kilogram calories per gram atom of oxygen.

2. A composition of claim 1 in which the refractory metal oxide particles have an average size in the range of from 5 to 600 millimicrons.

3. A composition of claim 1 in which the volume loading of refractory metal oxide in the metal is about from 0.5 to 30%.

4. A composition consisting essentially of a metal selected from the group consisting of molybdenum, rhenium, and tungsten, having uniformly dispersed therein particles of a refractory metal oxide having a melting point above 1000° C. and a free energy of formation at 1000° C. of from 60 to 150 kilogram calories per gram atom of oxygen, the uniformity of dispersion being such that, as shown by the replica electron microscope technique, there are no areas greater than about 1 micron in diameter which are free from refractory oxide particles, the oxide particles having an average size in the range from 5 to 200 millimicrons, and the volume loading of refractory in the metal being about from .5 to 30%.

5. A composition of claim 4 in which the metal is molybdenum and the refractory metal oxide has a melting point in the range above 2000° C.

6. A composition of claim 4 in which the metal is molybdenum and the refractory metal oxide is silica.

7. A composition of claim 4 in which the metal is molybdenum and the refractory metal oxide is thoria.

8. A composition of claim 4 in which the metal is molybdenum and the refractory metal oxide is zirconia.

9. A composition in powder form, said powder consisting essentially of particles in which there is a plurality of submicron sized refractory metal oxide particles having a melting point above 1000° C. and a free energy of formation at 1000° C. of from 60 to 150 kilogram calories per gram atom of oxygen, uniformly dispersed in a metal selected from the group consisting of molybdenum, rhenium, and tungsten, and there being no areas of metal in said powder particles greater than 1 micron in diameter which are free from said refractory metal oxide particles.

10. A composition in solid form, the solid consisting essentially of a metal selected from the group consisting of molybdenum, rhenium, and tungsten, said solid metal having uniformly dispersed therein sub-micron sized particles of a refractory metal oxide having a melting point above 1000° C. and a free energy of formation at 1000° C. of from 60 to 150 kilogram calories per gram atom of oxygen.

11. In a process for producing a uniform dispersion of a metal oxide in a metal, the steps comprising mixing substantially instantaneously (a) an aqueous solution of compound of a metal selected from molybdenum, tungsten and rhenium, said compound in aqueous solution forming positively and negatively charged ions, (b) an aqueous solution of a compound which in aqueous solution forms with charge opposite to that of the ion of (a) containing the metal selected from molybdenum, tungsten, and rhenium, said ion of opposite charge being selected from the group consisting of hydrogen, hydroxyl, carbonate, bicarbonate, oxalate, and carboxyl ions, and (c) a liquid dispersion of particles, having an average size in the range of 5 to 600 millimicrons, of an oxygen compound of a metal, said oxygen compound, when heated to constant weight at 1500° C., being a refractory metal oxide having a melting point above 1000° C. and a free energy of formation at 1000° C. of from 60 to 150 kilogram calories per gram atom of oxygen, the dispersion and solutions being brought together at such rates that in the resultant mixture the proportion of dissolved metal from (a) does not substantially increase and in each time interval which is at least 5 percent of the total time used in bringing the dispersion and solutions together the weight ratio of metal added in (a) to particles added in (c) is from 0.2 to 5 times the final weight ratio, whereby the metal ion from (a) is precipitated in the form of a hydrous, oxygen-containing compound coating surrounding the particles of (c), heating said precipitate-surrounded particles to a sufficiently elevated temperature that said precipitate is dehydrated and metal-oxygen compounds, other than oxides, in the surrounded particles are converted to the corresponding oxides, and thereafter reducing the precipitate coating to metal by bringing it into contact with a gaseous reducing agent selected from the group consisting of hydrogen, carbon monoxide, and hydrocarbon gases.

12. A process of claim 11 in which the liquid dispersion of particles (c) is a dispersion of a refractory oxide having a melting point above 1000° C. and a free energy of formation at 1000° C. of from 60 to 150 kilogram calories per gram atom of oxygen.

13. A process of claim 11 in which liquid dispersion (c) is a silica sol and the metal of solution (a) is molybdenum.

14. A process of claim 11 in which the liquid dispersion (c) is a dispersion of thoria and the metal of solution (a) is molybdenum.

15. A process of claim 10 in which the gaseous reducing agent is hydrogen.

16. A process of claim 10 in which the gaseous reducing agent is a hydrocarbon gas.

References Cited in the file of this patent

UNITED STATES PATENTS

| | | |
|---|---|---|
| 2,612,442 | Goetzel | Sept. 30, 1952 |
| 2,783,530 | Conant | Mar. 5, 1957 |
| 2,793,949 | Imich | May 28, 1957 |
| 2,798,808 | Iredell | July 9, 1957 |
| 2,823,988 | Grant et al. | Feb. 18, 1958 |
| 2,853,398 | Mackiw et al. | Sept. 23, 1958 |
| 2,853,401 | Mackiw et al. | Sept. 23, 1958 |
| 2,853,403 | Mackiw et al. | Sept. 23, 1958 |

UNITED STATES PATENT OFFICE

CERTIFICATE OF CORRECTION

Patent No. 2,949,358                      August 16, 1960

Guy B. Alexander et al.

It is hereby certified that error appears in the printed specification of the above numbered patent requiring correction and that the said Letters Patent should read as corrected below.

Column 11, line 45, after "forms" insert -- an ion --.

Signed and sealed this 4th day of April 1961.

(SEAL)
Attest:    ERNEST W. SWIDER

Attesting Officer

ARTHUR W. CROCKER
                                        Acting Commissioner of Patents